No. 820,601. PATENTED MAY 15, 1906.
G. W. ROBINSON.
GARDEN IMPLEMENT.
APPLICATION FILED JULY 25, 1905.
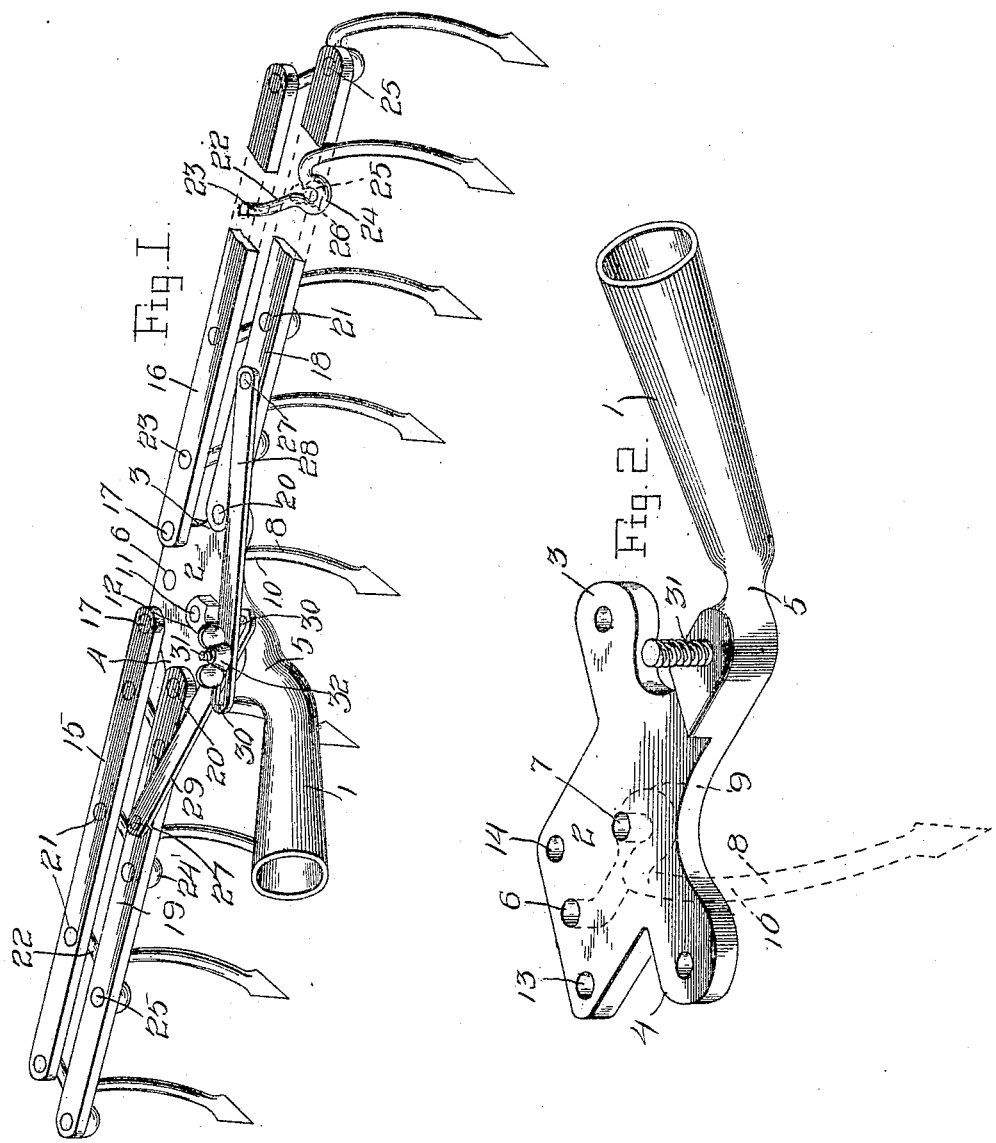
Witnesses
C. K. Reichenbach.
E. M. Dolford
Inventor
G. W. Robinson.
By Chandlee & Chandlee
Attorneys

UNITED STATES PATENT OFFICE.

GRANT W. ROBINSON, OF LODI, WISCONSIN.

GARDEN IMPLEMENT.

No. 820,601.   Specification of Letters Patent.   Patented May 15, 1906.

Application filed July 25, 1905. Serial No. 271,181.

*To all whom it may concern:*

Be it known that I, GRANT W. ROBINSON, a citizen of the United States, residing at Lodi, in the county of Columbia, State of Wisconsin, have invented certain new and useful Improvements in Garden Implements; and I do hereby declare the following to be a full, clear, and exact description of the invention, such as will enable others skilled in the art to which it appertains to make and use the same.

This invention relates to hand implements for garden-cultivating purposes.

One object of the invention is to provide a hand implement of such character that it may be easily and quickly adjusted for manipulation in narrow or wide spaces.

Another object of the invention resides in the provision of a hand cultivating implement embodying such characteristics that the tooth-bars thereof may be easily and quickly thrown into parallel relation, at an acute angle to each other or in direct alinement, and at a right angle to the handle of the implement.

A still further object of the invention resides in the provision of a hand implement of the character stated wherein two bars are arranged each for the support of a single row of teeth, the said bars being arranged in pairs and in parallel relation and the only connections between each pair being the single series of teeth associated therewith save for the connection of the inner ends of the bars to a head-plate.

A still further object of the invention is to construct the implement in such manner that it may be used as a rake, if desired.

It is still further designed to provide an exceedingly simple, inexpensive, durable, and efficient device of the character and for the purposes stated.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the present invention.

In the drawings, Figure 1 is a detail perspective view of my invention illustrated when used as a rake. Fig. 2 is a detail perspective view of the head-plate and handle-socket, including the post mounted thereon.

Referring now more particularly to the accompanying drawings, the reference character 1 designates a handle-socket formed integrally with the plate 2, provided upon each side with a laterally-directed perforated ear 3 and 4, the handle 1 being directed upwardly from the neck portion 5 between the plate and handle.

The plate 2 is provided with alining perforations 6 and 7, the forward perforation 6 receiving the forwardly-directed free end of a central tooth 8, which is bent intermediate its ends upon itself beneath the plate 2 to form a loop or eye, which registers with the rear perforation 7, forming a loop 9 in the tooth 8, from which loop the tooth is bent downwardly upon a forward curve, as clearly shown in the drawings. This tooth 8 is held permanently in its position with relation to the head-plate 2 by reason of its free end being bent upwardly through the notch 6, as aforesaid, and through the instrumentality of a bolt 11, whose head bears against the under faces of the looped portion of the tooth, with its opposite end screw-threaded and passed through the perforation 7 in the head-plate for the reception of a nut 12, which is screwed tightly upon the upper face of the head-plate.

The head-plate 2 is provided with spaced perforations 13 and 14, which aline with the aforesaid perforation 6, and pivoted in each of these perforations 13 and 14 is a tooth-bar 15 and 16, respectively, the pivot connection being made through the instrumentality of bolts or the like 17.

Pivotally secured in the aforesaid perforated ears 3 and 4 are tooth-bars 18 and 19, the pivotal connection of these bars being made through the instrumentality of suitable bolts, pivot-pins, or the like 20. It will thus be seen that there is a pair of tooth-bars arranged upon each side of the head-plate 2, and each pair is held in parallel relation one of its bars with relation to the other through the instrumentality of peculiarly-formed teeth, as will be explained.

Each tooth-bar of each pair is provided with a series of perforations 21, and each tooth has a horizontal portion 22, arranged between each pair of bars, the free end of each tooth being bent upwardly, as at 23, for engagement in the corresponding perforation of each of the inner tooth-bars, the opposite end of the horizontal portion 22 of each tooth being formed into a loop 24, designed to encircle the corresponding perforation of the outer tooth-bar of each pair, there being a bolt or other suitable element 25 passed through the said loop 24 of each tooth and the corresponding perforation of each outer bar, said bolts being provided with a head 26, designed to engage the under faces of the portions of the teeth forming the said loops with their free ends upset or in any other suitable manner prevented from becoming detached from the tooth-bars. The free upwardly-turned end at the upper end of each tooth is also upset or otherwise manipulated to prevent its accidental disengagement from the corresponding perforation of the inner tooth-bars. One way in which the connection between the free ends of the bolts passed between the loops and the free upwardly-turned ends of the teeth with respect to the bars is by countersinking the upper ends of the perforations of the bars, so that the free ends of the bolts and the free ends of the upwardly-turned portions 23 of the teeth may be flattened or otherwise manipulated to prevent their accidental disengagement and yet give a substantially flat face to the upper face of the bars. It will be understood that the upwardly-turned ends and the said bolts engaging the loops of the teeth are connected with the bar in such manner as to allow pivotal movement of the teeth with respect to the bars, or vice versa.

Pivotally connected to each outer bar by means of suitable pivot-bolts or the like 27 are links 28 and 29, each provided with a slot 30 at its outer end. These links 28 and 29 are designed to have their slotted ends overlap each other for engagement over the screw-threaded post 31, formed on the upper face of the neck portion between the plate 2 and the handle-socket 1, there being a thumb or other suitable nut 32, designed for engagement with the screw-threaded post for holding the slotted ends of the said links tightly in position, according to the movement or adjustment of the tooth-bars.

Reference to the accompanying drawings will disclose that the pointed ends of the teeth are always directed forwardly of the device regardless of the position of the tooth-bars, and it will be understood that by reason of the fact that the tooth-bars are pivotally connected in pairs to the head-plate 2 and each tooth itself having pivotal connection to the bars of each pair, the tooth-bars may be adjusted at different angles with respect to the plate and each pair with respect to the other or each pair independently of the other, the slotted links in association with the screw-threaded post 31 and the said thumb-nut 32 providing means for holding the pairs of tooth-bars and their teeth in any adjusted position desired. It will also be understood that a handle (not shown) may be secured in any suitable manner in the handle-socket 1 to obviate the necessity of the manipulator bending his back or that, if desired, the handle may be eliminated and the device manipulated by grasping the socket itself. In other words, under certain conditions the socket 1 may be used as a handle.

What is claimed is—

A device of the class described comprising a handle-socket, a head-plate, a pair of tooth-bars pivotally mounted upon each side of the head-plate, said bars being each provided with a series of perforations, a series of teeth, each including shanks bent upon themselves to form eyes and having their extreme end portions turned upwardly and engaged in the openings in one of the bars of each pair, and fastening means engaged through the openings in the other bars of said pairs and through said eyes.

In testimony whereof I affix my signature in presence of two witnesses.

GRANT W. ROBINSON.

Witnesses:
ROY L. RHOADES,
HERBERT PALMER.